Aug. 7, 1956　　　C. A. TUDBURY　　　2,758,187
HIGH-FREQUENCY INDUCTOR ARRANGEMENT
Filed March 10, 1951　　　3 Sheets-Sheet 1
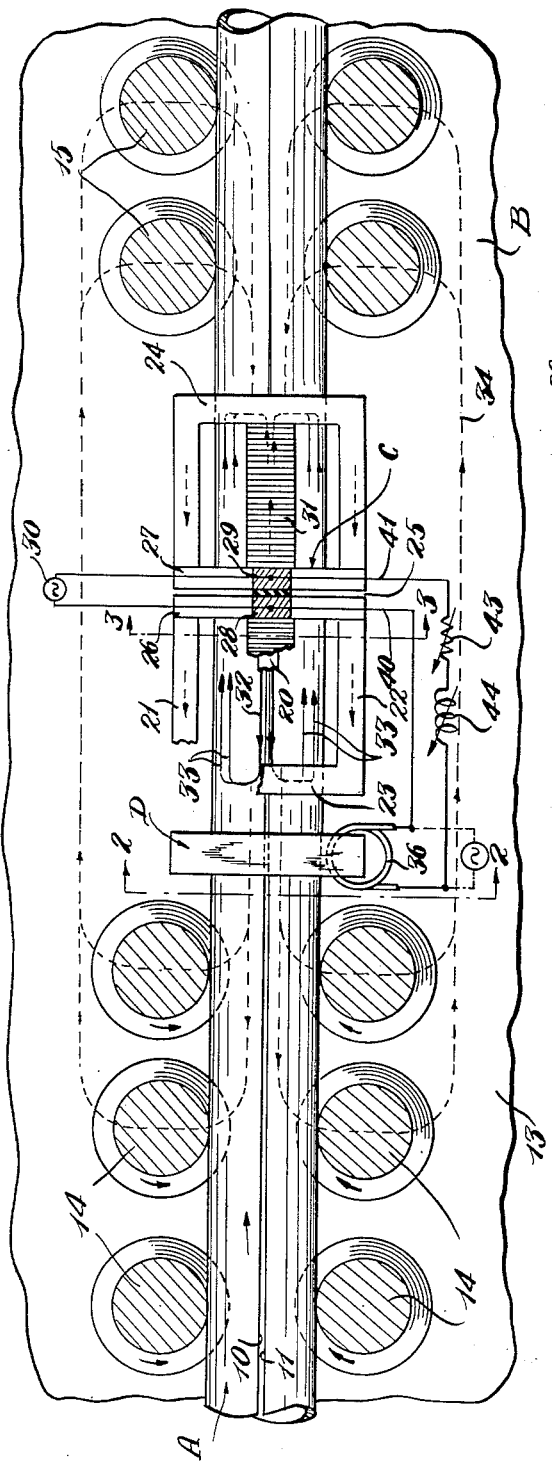
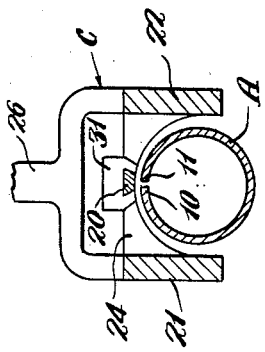
FIG. 3
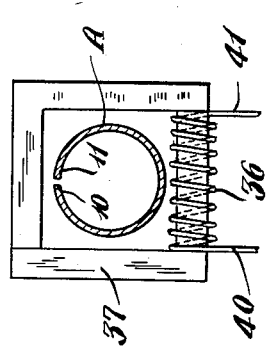
FIG. 2
FIG. 1
INVENTOR.
CHESTER A. TUDBURY
BY
Alfred C. Body
ATTORNEY

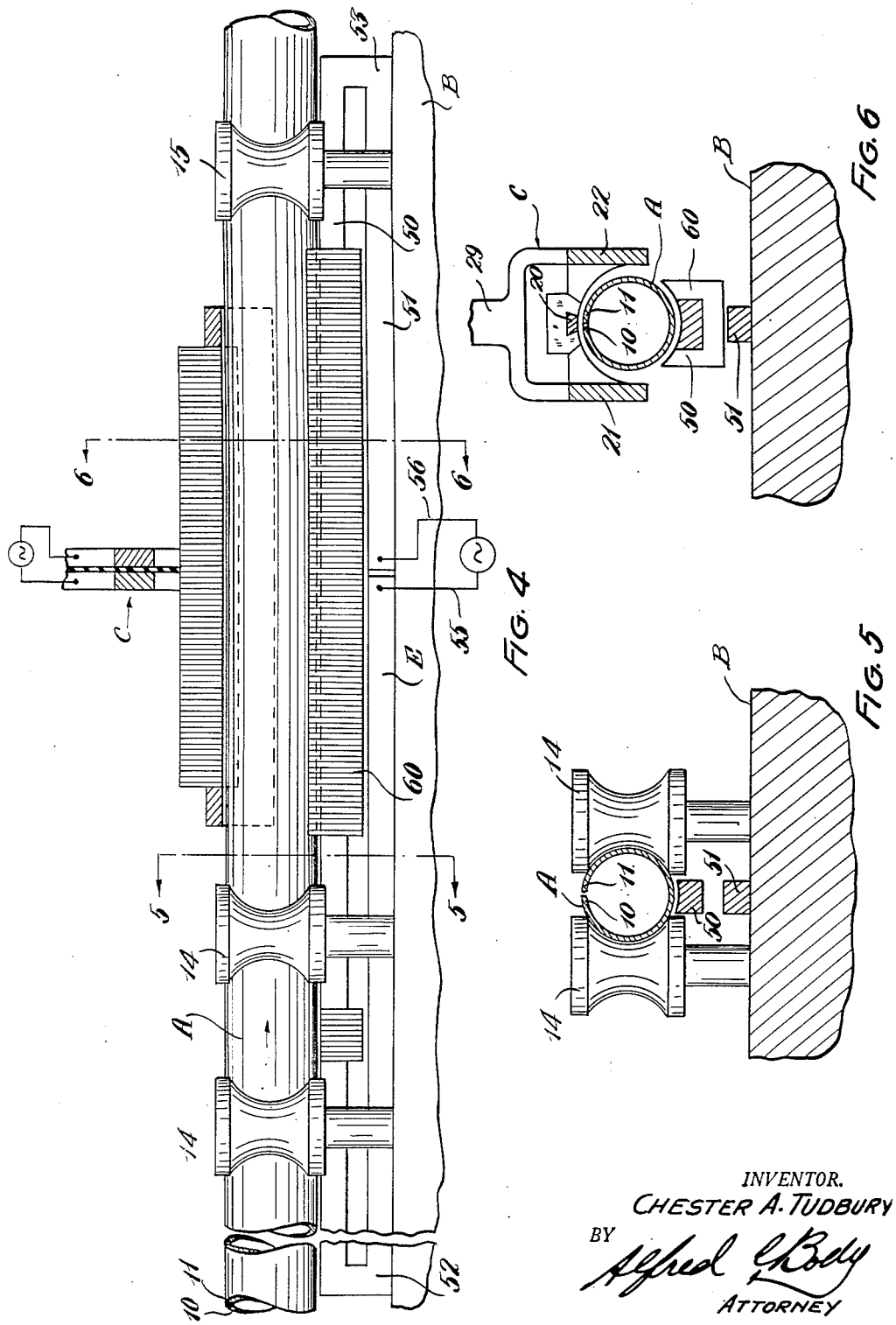

Aug. 7, 1956  C. A. TUDBURY  2,758,187
HIGH-FREQUENCY INDUCTOR ARRANGEMENT
Filed March 10, 1951  3 Sheets-Sheet 3
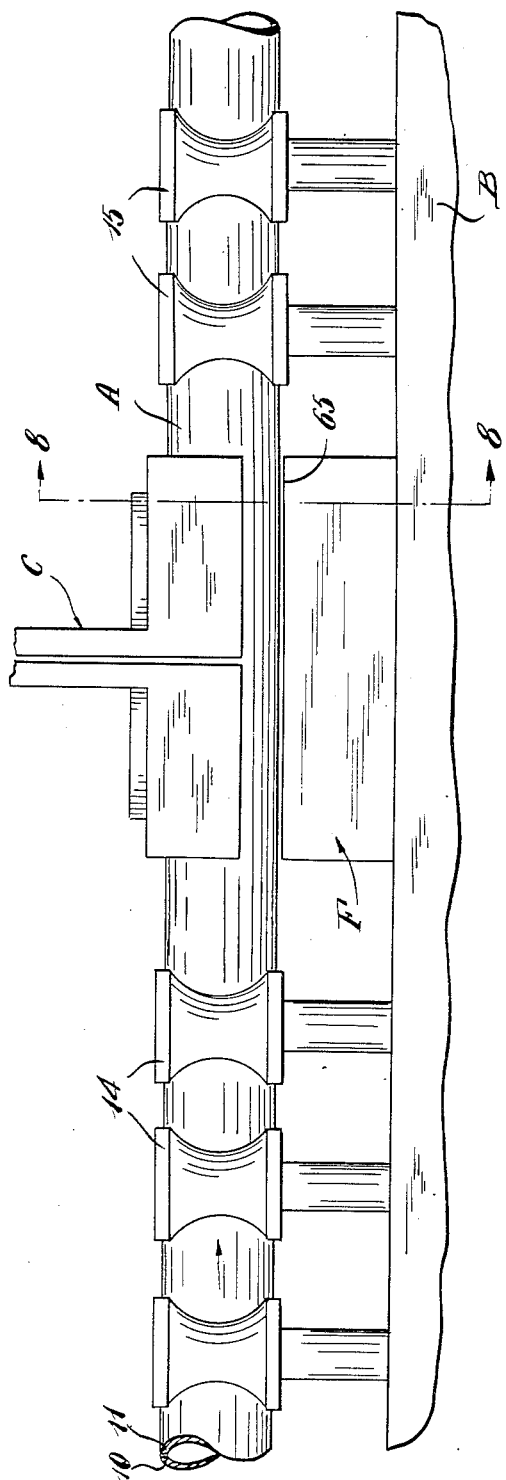
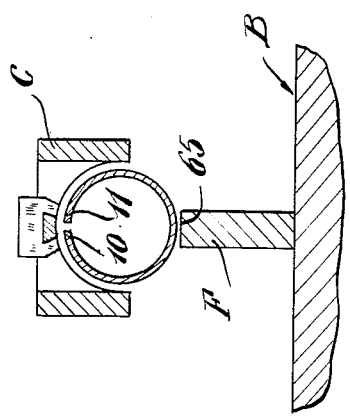
INVENTOR.
CHESTER A. TUDBURY
BY
Alfred G Body
ATTORNEY

United States Patent Office

2,758,187
Patented Aug. 7, 1956

2,758,187

HIGH-FREQUENCY INDUCTOR ARRANGEMENT

Chester A. Tudbury, Cleveland, Ohio, assignor to The Ohio Crankshaft Company, Cleveland, Ohio, a corporation of Ohio Application March 10, 1951, Serial No. 214,920

8 Claims. (Cl. 219—10.53)

This invention pertains to the art of electrical high-frequency induction heating and, more particularly, to a combination of high-frequency inductors and a method of inducing currents for heating longitudinal lengths of elongated workpieces.

The invention is particularly adapted to equipment for continuous seam welding of the edges of metallic strip into pipe or tube using high-frequency induction heating to heat the edges to the welding temperature and, for the purpose of clarity, will be described with particular reference to such equipment, although the invention is useful elsewhere. The use of high-frequency induction heating and suitable inductors for heating the edges have been clearly set forth and described in the copending applications of Phillips N. Sorensen, Serial No. 58,228, filed November 4, 1948, now Patent No. 2,632,840, dated March 24, 1953, and Serial No. 86,066, filed April 7, 1949, now abandoned in favor of a continuation-in-part application Serial No. 322,179, filed November 24, 1952, now Patent No. 2,652,474 dated September 15, 1953. The present invention provides means, in combination with inductors of this type, for accomplishing the objects of the invention.

In the art of continuous seam welding, flat strip is formed by suitable rolls into a generally closed tube with the edges in close spaced opposed relationship. The edges are then heated to a welding temperature by high-frequency induction heating. The heated edges are then brought into pressure engagement by welding rolls to complete the weld, the entire operation being done continuously and at rather high rates of speed. A typical installation now in use continuously welds at tube speeds of around 200 feet per minute using approximately 300 kws. of 10,000 cycle per second electrical energy.

As described in the above referred to applications, the high-frequency inductors include an elongated main conductor which is disposed parallel to and immediately over the edges of the tube to be heated and one or more side or return conductors which are disposed remotely from the edges and generally adjacent the sides of the tube. High-frequency currents flowing in the main conductor induce highly-concentrated, high-frequency currents to flow longitudinally in each edge immediately underneath the conductor. It has been estimated that these currents, for the conditions above referred to, are in the neighborhood of 8,400 amperes and flow in a very narrow width adjacent the edges to produce a very rapid and concentrated heating effect. The return-current path is, according to the above referred to applications, in the portions of the tube remoted from the edges. These currents, while generally of the same magnitude as the current in the edges themselves, are spread out over a large part of the circumferential width of the tube and do not produce any appreciable heating effect.

Excellent welds have been produced at high speeds of movement of the tube using inductors of this type. However, difficulty has been experienced with unduly short life of the bearings which support the forming and welding rolls on the base of the machine.

As a result of the present invention, I have discovered that the ideal current flow described above which it was thought resulted with the inductors as above described did not actually result and that some of the concentrated main heating currents in the edges, instead of returning in the portions of the tube remote from the edges, actually flowed longitudinally of the tube beyond the ends of the inductor, the return path being formed through the forming and welding rolls and the metallic base of the seam-welding machine. These currents flow through the bearings supporting the rolls and, either by electrolysis or arcing or otherwise, deteriorated the surfaces of the bearing and radically shortened their life.

This current flow may be due to a number of reasons which now seem quite apparent but required much thought and experimental work before becoming so. For example, the electrical resistance of the side walls of the tube under the inductor is extremely low and it was thought that all of the return currents would, obviously, follow this path as a return path. However, upon further analysis, it appears that the welding machine itself; that is, the welding rolls, the forming rolls and the base of the machine, form a parallel electrical circuit with the side walls of the tube. The electrical resistance of this circuit may be relatively high compared to that of the side walls of the tube; but, even with a difference of twenty times, with a total return-current flow in excess of 8,000 amperes, the electrical circuit through the machine would carry currents in excess of 400 amperes. Another reason to which the return-current flow through the welding machine itself may be attributed is the fact that the main heating conductor normally has a much higher degree of electrical coupling with the tube than do the side conductors; i. e., the side conductors have a higher leakage reactance than the main conductor which shows up as currents flowing through the electrical circuit formed by the base of the machine itself and the rolls.

It has been proposed to use rolls which are electrically insulated from the base or to divide the base under the inductor and electrically insulate the two sections or to provide other forms of electrical insulation on the seam-welding equipment, but any one of these solutions would involve major redesigning and reconstruction of the seam-welding equipment and would, in any event, be quite expensive.

The present invention contemplates means and method for overcoming all of the above difficulties and eliminating or mitigating the flow of current through the workpiece supporting, forming and welding rolls which is simple, inexpensive and dependable in operation.

In accordance with the present invention, there is provided, for inductively heating longitudinal lengths of an elongated workpiece supported between longitudinally spaced workpiece supports electrically connected together by a base forming with the workpiece a closed electrical loop, the combination of a high-frequency inductor which induces concentrated currents to flow longitudinally of the workpiece and means for lessening or eliminating the flow of any current in the closed electrical loop. These means may comprise means for reducing the reactance of the return-current path in the tube, or inducing a voltage in the electrical loop which is out of phase with and equal to any voltages induced by the inductor tending to cause current flow in the loop. The means for reducing the reactance of the tube to the return flow of current comprises closed electrically-conductive loops in inductive relationship with the sides of the tube in which the return currents must flow, or a high-frequency energized electrical loop or inductor. The means for inducing the voltage in the electrical loop comprises a single or multiturn coil or inductor in voltage-inducing relationship with the electrical loop, the planes in the loop of the coil being parallel to the axis of the induced or stray currents, the coil being energized from a power source having the same frequency as the power source energizing the high-frequency inductor; e. g., the same power source as the inductor, and so connected electrically as to give the proper voltage and phase relationship.

The principal object of the invention is the provision of a new and improved combination of high-frequency inductors which eliminate the flow of stray currents in workpiece-supporting equipment which is simple, inexpensive, electrically efficient and positive in operation.

Another object of the invention is the provision, in a continuous welder for opposed edges of metallic members of a new and novel combination, of a high-frequency inductor for heating the edges to the welding temperature and means for preventing the flow of the induced currents through parts of the welder.

Another object of the invention is the provision of new and improved combination of means for inducing high-frequency heating currents to flow longitudinally in an elongated workpiece supported between spaced workpiece supports and means for introducing voltages in the workpiece between the supports with a phase relationship, the voltages induced by the first-mentioned means including a coil inductively coupled with the electrical loop formed by the workpiece and the work support.

Another object of the invention is the provision, in high-frequency induction-heating equipment which supports a workpiece at spaced points and has an inductor which induces currents to flow longitudinally of the workpiece between the supported points, of an auxiliary inducing coil for inducing voltages in a direction opposite to the voltages induced by the inductor to eliminate the flow of current from the workpiece into the supporting equipment.

Another object of the invention is the provision of an auxiliary coil for use in combination with an inductor which induces a concentrated flow of current in a workpiece in a direction between the points of support therefor, which coil induces voltages in the workpiece opposite to those of the inductor to prevent the flow of current from the workpiece into the support.

The invention will be specifically set forth and defined in the claims. The invention may take physical form in a number of different-appearing parts and arrangement of parts, a preferred embodiment of which will be described in detail in this specification and illustrated in the accompanying drawing which is a part hereof, and wherein:

Figure 1 is a top plan view partly in section of a continuous seam-welding machine embodying the present invention employing high-frequency induction heating for heating the edges, in combination with an auxiliary-inducing coil;

Figure 2 is a cross-sectional view of Figure 1 taken approximately on the line 1—1 thereof;

Figure 3 is a cross-sectional view of Figure 1 taken approximately on the line 3—3 thereof;

Figure 4 is a side elevational view somewhat similar to Figure 1 but showing an alternative embodiment of the invention;

Figure 5 is a cross-sectional view of Figure 4 taken approximately on the line 5—5 thereof;

Figure 6 is a cross-sectional view of Figure 4 taken approximately on the line 6—6 thereof.

Figures 7 and 8 are views showing further alternative embodiments of the invention.

Referring now to the drawings which are for the purposes of illustrating the invention only and not for the purposes of limitation, Figure 1 shows a workpiece in the form of a C-shaped metallic tube A having edges 10, 11 to be welded; a workpiece support in the form of a relatively conventional seam-welding machine B; a main high-frequency inductor C in inductive relationship with the tube A for heating the edges to the welding temperature and an auxiliary inductor D coupled with the tube for inducing voltages in the tube beyond the end of the inductor contra-to those introduced by the main inductor to eliminate stray currents through the machine B.

The tube A is shown in the drawing as being round. It may, of course, be of any other shape and of any desired electrically-conductive material such as steel, copper, aluminum or the like. It is formed generally from a narrow flat strip to the desired shape with the edges in close spaced parallel relationship, which edges are completely welded as the tube leaves the machine B.

The machine B, other than as an element of a very workable combination, forms no part of the present invention and will be described only briefly. It includes generally a base 13 on which are rotatably supported a plurality of opposed sets of forming rolls 14 and welding rolls 15, longitudinaly spaced along the axes of the tube A. The base 13 may be formed in one or a plurality of parts which are inescapably electrically connected together in one way or another. The rolls 14, 15 are rotatably supported relative to the base by roller bearings or the like not shown and are driven by power means not shown and rapidly advance the tube A from left to right through the forming rolls which shape it from a flat strip to the desired shape, thence under the inductor C where the edges are heated to the welding temperature and then through the welding rolls 15 where the heated edges are forced into pressure-welding engagement. One or more sets of welding rolls may be employed, depending upon the length of time which the edges must be held in pressure engagement or the force required to effect the welding operation. It is to be noted that the tube A, rolls 14, 15 and base 13 form a closed electrically-conductive loop indicated by the loop 34.

The inductor C is similar to that shown in the copending application of Alfred C. Body and James W. Williamson, Serial No. 146,888, filed February 28, 1950, now Patent No. 2,671,846, and will not be described in detail here other than to say that it comprises an elongated main conductor only 20 disposed parallel to and in slightly spaced symmetrical relationship to the edges 10, 11, a pair of side conductors or legs 21, 22 in spaced parallel relationship to the main conductor 20 and generally enclosing both sides of the tube A. Corresponding ends of the main conductor and the side conductors are electrically connected together by end conductors 23, 24. The side conductors 21, 22 are split as at 25 and the ends formed thereby are electrically connected together by inverted U-shaped conductors 26, 27 which extend over the main conductor 20. Fish-tail leads 28, 29 respectively connect to the center of the base of the U-shaped conductor and to a suitable high-frequency power source 30 through an impedance-matching transformer not shown. Generally, the entire inductor described is supported relative to the tube A from the transformer which, in turn, is mounted on suitable brackets on the machine B. The main conductor 20 has, over its entire length, a stack of inverted U-shaped laminations 31 disposed about its sides other than the workpiece-facing side. These laminations increase the degree of coupling of the main conductor 20 with the tube A over the side legs or the conductor 20 without laminations. Increased concentration of current flow and heating results.

As more fully described in the above referred to copending applications of Phillips N. Sorensen, inductors of the type described in this application induce a high-frequency current flow in the tube which, at any one instant, causes a concentrated heating current to flow in the same direction in both edges 10, 11 as shown by the single heavy arrow 32, the return flow for which is spread out in the sides of the tube remote from or spaced from the edges 10, 11 as shown by the lighter arrows 33. These currents in the edges 10, 11 may run to as high as 8–9000 amperes or to densities in excess of 600,000 amperes per square inch and rapidly heat the edges to the welding temperature. The current density of the return currents is normally in the neighborhood of 30,000 to 40,000 amperes per square inch more or less, depending on the diameter of the tube being welded. Ideally, all of the current in the edges of the tube would flow in the opposite direction in the walls of the tube.

As a result of the present invention, I have found that the ideal current flow above referred to does not actually exist in the tube. Instead, some of the main heating current 32 flows longitudinally of the tube beyond the ends of the inductor and back through the closed current loop or circuit as shown by the dotted lines 34; i. e., through the forming rolls and its bearings, through the base itself, the welding rolls and its bearing and thence back into the tube A. This current is not large compared to the actual heating currents flowing in the edges but, as now appears, it is sufficient to cause deterioration of the bearings supporting the forming and welding rolls. In partial explanation, the resistance of the current path 34 is in electrical parallel relationship with the return path 33 of the current in the sides of the tube. If the reactance of the path 34 were ten times that of the path 33, currents on the order of 800 amperes could easily result. The current loop, as shown by the dotted lines, has a relatively low electrical resistance so that a very small electromotive force can cause a relatively large current to flow in this loop.

The auxiliary inductor D is for the purpose of inducing in the tube A; that is to say, in the closed circuit shown by the dotted lines 34, a voltage of a phase and magnitude to counteract and offset the voltage induced by the inductor C which tends to cause the undesired current flow.

In the preferred embodiment of the invention shown in Figure 2, the inductor D is comprised of a multiturn electrical coil 36 magnetically coupled to the tube A with the plane of each turn of the coil parallel to the axis of the direction of the undesired current flow; i. e., parallel to the axis of the tube A. A rectangular stack 37 of magnetic laminations surrounds the tube A and one leg thereof extends through the interior of the coil to increase the magnetic coupling of the coil with the tube A. This coil is energized from a high-frequency power source having the same frequency as the power source 30 energizing the inductor C. This may be a separate power source or the power source 30 may be used for this purpose, the coil 36 being connected to the fish-tail leads 28, 29 by means of a pair of conductors 40, 41. A variable resistance 43 shown schematically is in series with the lead 41 for the purpose of adjusting the energizing current flowing in the coil 36 so that the longitudinal voltage induced in the tube A by the coil 36 may be adjusted to the proper value. A variable reactance 44, shown schematically, is also in series with the lead 41 so that the phase of the induced voltage may be adjusted relative to the phase of the voltages induced by the inductor C. By proper design, the resistance and reactance may be dispensed with entirely.

Alternatively, the leads 40, 41 may be tapped across portions of the coil 36 to control the amount of voltage generated in the tube A or the leads 40, 41 may be tapped across portions of the inductor C having the desired voltage differential therebetween and phase difference. The coil 36 need not be of a large current-carrying capacity. The function of the coil 36 is simply to induce a voltage in the closed loop formed by the tube, the welding and forming rolls and the base of the machine equal and opposite and properly phased to the voltages induced by the inductor C which would normally tend to cause current flow in the rolls.

In operation, the tube A advances rapidly from left to right through the machine B. High-frequency currents circulating in the inductor C induce concentrated, high-frequency currents to flow in the edges 10, 11, which edges are then brought together into welding relationship by the welding rolls 15. The amount of current flowing in the inductor C depends, to a large extent, upon the speed of movement of the tube A. The faster the tube A moves, the more heat which must be supplied in a given time and the greater the amount of current which must flow in the inductor C. Variations in the amount of currents flowing in the inductor C will, obviously, cause varying amounts of voltages which must be induced by the auxiliary inductor D. After the mill is in operation, the amount of voltage induced by the inductor D and the phase thereof is adjusted using current-indicating equipment associated with the tube beyond the end of the inductor C or with the rolls themselves until no or a minimum current flow is indicated. This adjustment should then hold for this particular adjustment of power input to the inductor C. Should the power input to the inductor C have to be changed for any reason, the amount of voltage induced by the inductor C will also have to be varied. This may be accomplished automatically by energizing the coil 36 from the fish-tail leads of the inductor C so that, as the power to the inductor C is increased or decreased, the currents in the coil 36 will likewise be increased or decreased. Once the phase relationships have been adjusted, changes in the power input to the inductor C will not necessitate further adjustment of the power to the coil 36.

Referring now to Figures 4, 5 and 6 wherein there is shown an alternative embodiment of the invention, in Figure 4 the inductor C and the welding machine B are identical with the machine described with reference to the preferred embodiment. The auxiliary inductor in this embodiment is designated by the reference numeral E and comprises an elongated rectangular loop or one-turn coil, including an upper conductor 50, a lower conductor 51 extending in spaced parallel relationship with the upper conductor and end conductors 52, 53 connecting the respective ends of the upper and lower conductors 50, 51. The lower conductor 51 is split somewhere along its length and leads 55, 56 extend to a source of high-frequency energy in a manner similar to that described with reference to the auxiliary inductor D in connection with the preferred embodiment. The plane of the loop of the auxiliary inductor E, as shown, is parallel to the direction of the currents being induced in the tube A by the principal or main inductor C. As shown, this auxiliary inductor E is close coupled with the length of the tube A and extends, in the embodiment shown, from a point to the right of the welding rolls to a point well to the left of the forming rolls. The upper conductor 50 is in close spaced relationship with the lower side of the tube A and, to increase the coupling, its upper surface is generally concave to match the curvature of the tube A. Also, its width is considerable, particularly when compared to the width of the main conductor 20 of the principal inductor C, so that any currents which it might induce to flow in the tube A will be widely distributed and no appreciable heating will result. U-shaped laminations 60 enclose the three sides of the upper conductor 50 away from the tube A to further increase the coupling of this conductor with the tube A. These laminations 60 may be continued along the entire length of the conductor 50. Because of the welding and forming rolls, the laminations may be omitted where the conductor 50 passes between the welding and forming rolls as shown in Figures 4 and 5.

It will be appreciated that the auxiliary inductor E may be shorter than that shown in Figure 4. It may be positioned entirely beyond one end of the inductor C or two may be employed. Also, the inductor E may have a length similar to that of the inductor C and disposed opposite thereto and the lower conductor 51 may be made continuous over its entire length so that the principle of self-induction is employed. In this case, the effect would be to lower the reactance of the side walls of the tube to the flow of the return current and, thereby, cause greater proportions of current to flow therein. This shorter coil could also be energized from a high-frequency source.

Figures 7 and 8 show another alternative embodiment of the invention. In this embodiment, the seam-welding machine B and the principal inductor are again identical with that shown in the preferred embodiment of Figure 1. The auxiliary inductor, here designated as F, comprises an elongated rectangular sheet or plate of high-conductivity material, such as copper, having its principal plane disposed parallel with the axis of the tube A and having an upper edge 65 in close spaced relationship with the lower edge of the tube A. This plate is disposed on the side of the tube A opposite to the principal inductor C and lowers the reactance of walls of the tube removed from the edges 10, 11 to increase the tendency for the return currents to flow in the tube and not through the machine B.

The invention has been shown and described with reference to a single type of principal inductor C. The invention is not limited to inductors of the type shown in the figures. For example, other inductors may be readily employed such as the type shown in my copending application Serial No. 214,919 filed March 10, 1951, now Patent No. 2,689,297. The principal requirement of the main inductor C is that it be of a type to induce currents longitudinally of a workpiece between the points of the machine which support the workpiece and the invention is directed to overcoming inherent difficulties with this type of inductor.

The invention has been described with particular reference to a seam-welding machine because it was here that the problem of stray currents has been particularly troublesome because of the high speeds of movement of the tube A and the very high pressures on the bearings supporting the rolls. These bearings can be troublesome due to the mechanical loads involved without the added problem of requiring the bearings to handle large amounts of electric current.

In accordance with the patent laws, a preferred embodiment of the invention has been described in detail. Obviously, modifications and alterations will occur to others upon a reading and understanding of this specification. It is my intention to include all such modifications and alterations insofar as they come within the scope of or are the equivalent of the structure called for in the appended claims.

Having thus described my invention, I claim:

1. A continuous seam-welding machine having welding and forming rolls in electrically-connected relationship and adapted to advance a C-shaped tube to be welded, a main high-frequency inductor disposed between said forming and said welding rolls of a type which induces high-frequency currents to flow longitudinally of said tube principally in one direction at any one instant and an auxiliary inductor independent of said main inductor in coupled relationship with said tube having at least a turn of electrically-conductive material, the plane of said turn being parallel to the axis of and through the walls of said tube and means for energizing said auxiliary inductor to oppose any longitudinal flow of current from said main inductor beyond the ends thereof.

2. In high-frequency induction-heating equipment including a pair of spaced workpiece supports and a high-frequency inductor between said supports of a type which induces currents to flow in said workpiece in a longitudinal direction between said workpiece supports, the improvement which comprises an auxiliary inductor coupled with the workpiece of a type which induces currents to flow in said workpiece in between said workpiece supports, principally in a parallel direction at any one instant including at least a turn of electrically-conductive material and means for flowing high-frequency electric currents in said auxiliary inductor having a frequency the same as that for the principal inductor and a phase to induce voltages principally in a direction opposite to that of the principal inductor.

3. In high-frequency induction-heating apparatus including a base, a pair of workpiece supports in spaced relationship and being electrically connected by said base, a main high-frequency inductor of the type which induces principal currents to flow in the workpiece in a direction between said supports and means for causing the return currents of said principal currents to flow in said workpiece between said workpiece supports and not through said workpiece supports and said base, comprising an auxiliary inductor adapted to be in coupled relationship with said workpiece and means for energizing said auxiliary inductor from the same power source as said principal inductor with a phase relationship to induce currents to flow in the workpiece principally in a direction opposite to the principal heating currents of the main inductor.

4. The combination of claim 3 wherein the auxiliary inductor is comprised of a rectangular loop of magnetically-permeable material adjacent an end of said inductor having a central opening through which the workpiece is adapted to extend and a plurality of turns of electrically-conductive material on said rectangular loop of magnetic material.

5. The combination of a main and an auxiliary high-frequency inductor, said main inductor comprising an elongated, generally straight conductor adapted to be disposed in close spaced parallel relationship with a surface on an elongated workpiece, said auxiliary inductor comprising a conductor adapted to be magnetically coupled with other portions of said workpiece and means for energizing said auxiliary inductor to induce voltages in the workpiece primarily in phase opposition with the voltages induced in the workpiece by the main inductor.

6. The combination of a main and an auxiliary high-frequency inductor, each adapted to be magnetically coupled with an elongated workpiece, said main inductor comprising an elongated, generally straight conductor adapted to be disposed in close spaced parallel relationship with the length of the workpiece and induce longitudinal currents to flow therein, said auxiliary inductor including an electrically-conductive coil having not more than one-half turn thereof coupled with said workpiece.

7. The combination of a main and an auxiliary inductor adapted to be magnetically coupled with an elongated workpiece, said main inductor comprising an elongated, generally straight conductor member through which high-frequency currents are adapted to be flowed and induce high-frequency currents to flow in said workpiece, said auxiliary inductor comprising a rectangular stack of magnetic laminations disposed beyond an end of said main inductor and having a transverse opening therethrough through which the workpiece is adapted to extend and a coil of conductive material about a leg of said stack of laminations and means for energizing said coil with electrical energy of the same frequency as the electrical energy energizing said conductor member but with a phase relationship to induce voltages in the workpiece out of phase with the voltages induced by the main conductor member.

8. The method of inductively heating narrow elongated portions on an elongated workpiece supported at spaced points on both sides of the portion to be heated by supports in electrically conductive relationship which comprises inducing high-frequency electric currents to flow in a concentrated manner in said portion, at any one instance, in one direction, and in other portions, in an unconcentrated manner but in the opposite direction at that instant, and inducing voltages in said workpiece beyond the end of the portion to be heated but between the supports of an amount to equal the tendency of the concentrated induced currents to form a return path through the workpiece supports.

(References on following page)

References Cited in the file of this patent

UNITED STATES PATENTS

| | | |
|---|---|---|
| 1,845,322 | Neuhauss | Feb. 16, 1932 |
| 1,915,047 | Blakeslee | June 20, 1933 |
| 2,144,378 | Kennedy | Jan. 17, 1939 |
| 2,448,011 | Baker et al. | Aug. 31, 1948 |
| 2,460,687 | Fuchs | Feb. 1, 1949 |
| 2,583,227 | Neidigh | Jan. 22, 1952 |
| 2,632,079 | Body | Mar. 17, 1953 |

FOREIGN PATENTS

| | | |
|---|---|---|
| 616,063 | Great Britain | Jan. 14, 1949 |
| 682,558 | Great Britain | Nov. 12, 1952 |